US006187367B1

(12) United States Patent
Cho et al.

(10) Patent No.: US 6,187,367 B1
(45) Date of Patent: Feb. 13, 2001

(54) LOW VISCOSITY MEAT EMULSION AND PROCESS FOR PRODUCING A PROTEIN COMPOSITION USEFUL TO FORM A LOW VISCOSITY MEAT EMULSION

(75) Inventors: Iue Chung Cho; Charles Edward Coco, both of St. Louis, MO (US); Gregory A. Bates, Collinsville, IL (US)

(73) Assignee: Protein Technologies International, Inc., St. Louis, MO (US)

( * ) Notice: Under 35 U.S.C. 154(b), the term of this patent shall be extended for 0 days.

(21) Appl. No.: 08/936,292

(22) Filed: Sep. 25, 1997

(51) Int. Cl.[7] .......................... A23L 1/317; A23L 1/0522
(52) U.S. Cl. ........................ 426/646; 426/92; 426/103; 426/105; 426/520; 426/578; 426/629; 426/634; 426/652; 426/657
(58) Field of Search .................. 426/646, 520, 426/578, 657, 92, 103, 652, 105, 629, 634

(56) References Cited

U.S. PATENT DOCUMENTS

| | | | |
|---|---|---|---|
| 3,833,413 | 9/1974 | Glabe et al. | 127/29 |
| 3,836,677 | 9/1974 | Freck et al. | 426/103 |
| 3,865,959 | 2/1975 | Lecluse | 426/212 |
| 4,044,158 | 8/1977 | Burkwall, Jr. | 426/271 |
| 4,159,982 | 7/1979 | Hermansson | 260/119 |
| 4,251,556 | 2/1981 | Burkwall, Jr. et al. | 426/332 |
| 4,297,382 | 10/1981 | Hosaka | 426/656 |
| 4,562,082 | 12/1985 | Morimoto | 426/104 |
| 4,690,820 | 9/1987 | Simko | 424/128 |
| 5,061,504 | 10/1991 | Kong-Chan et al. | 426/582 |
| 5,064,660 | 11/1991 | Silver | 426/36 |
| 5,080,921 | 1/1992 | Reimer | 426/564 |
| 5,435,851 | 7/1995 | Kasica et al. | 127/69 |
| 5,593,717 | * 1/1997 | Huber et al. | 426/578 |
| 5,702,741 | * 12/1997 | Reutimann | 426/92 |

FOREIGN PATENT DOCUMENTS

| | | |
|---|---|---|
| 2128872 | 5/1984 | (GB) . |
| 60 186252 | 11/1976 | (JP) . |

OTHER PUBLICATIONS

Functional Effect of Carbohydrates in Soybean Preparations—A Model Study Barylko–Pikielna et al., Acta Alimentaria Polonica, vol. VI (XXX), No. 3, pp. 101–107 (1980).

Gel Strength of Starch Upon The Addition of Soy Protein and Food Oil (Effect of Food Components on Physical Properties of Starch, Part 4), Ojima et al., Denpun Kagaku (J. Japanese Soc. Starch Sci.), vol. 33, No. 3, pp. 183–190 (1986).

Rheological Properties of Gum and Milk Protein Interactions, Schmidt, et al., J. Dairy Sci., vol. 75, pp. 36–42 (1992).

Thermal Denaturation of Whey Proteins in Skim Milk, Parris et al., J. Agric. Food Chem., Vol. 39, p. 2167–70 (1991).

Study of the Hygroscopic Properties of Meat and Meat Products, Rogov and Dianova, Myasnaya Industriya SSSR, No. 12, pp. 29–31 (1978).

Gelation Kinetics of Meat Emulsions Containing Various Fillers During Cooking, Correia and Mittal, J. Food Process Eng., vol. 14, pp. 35–49 (1991).

Spherical Aggregates of Starch Granules as Flavor Carriers, Zhao and Whistler, Food Technology, pp. 104–105 (Jul. 1994).

\* cited by examiner

*Primary Examiner*—Helen Pratt
(74) *Attorney, Agent, or Firm*—Richard B. Taylor

(57) ABSTRACT

A low viscosity, high gel strength protein-starch composition is provided. The protein-starch composition contains a denatured protein material and a starch material which are complexed together where the starch material is in a substantially non-gelatinized state. The protein-starch composition has a low viscosity prior to cooking, yet has a high gel strength after being cooked. A meat emulsion is also provided which contains a meat material and the protein-starch composition. A process is provided for forming the protein-starch composition in which an aqueous slurry of a protein material is formed, the protein in the slurry is denatured by subjecting the slurry to temperatures sufficient to denature the protein, a starch material is mixed into the slurry of denatured protein, and the slurry of starch and protein material is spray dried under conditions which cause the protein material and starch material to complex without gelatinizing the starch material. A process for forming a meat emulsion with the protein-starch composition is provided in which a meat material and the protein-starch composition are blended together under conditions insufficient to gelatinize the starch material in the protein-starch composition.

50 Claims, No Drawings

LOW VISCOSITY MEAT EMULSION AND PROCESS FOR PRODUCING A PROTEIN COMPOSITION USEFUL TO FORM A LOW VISCOSITY MEAT EMULSION

BACKGROUND OF THE INVENTION

1. Field of the Invention

The present invention relates to a low viscosity, high gel strength protein-starch composition, a meat emulsion containing the same, and a process for producing the protein-starch composition and meat emulsion. More particularly, the present invention relates to a protein-starch composition containing a complex of a protein material and a starch where the starch is substantially in its native nongelatinized conformation, and a meat emulsion containing the same.

2. Description of the Related Art

Protein materials are widely used to supplement meat products since meat is more scarce worldwide, and much more expensive, than protein materials, which are relatively abundant. For example, soy protein materials such as soy isolates and soy concentrates are commonly used as meat analogs or as meat extenders. The protein materials may be used in several forms of meat products, for example, a protein material may be mixed with ground meat to form meat patties useful for hamburgers, meat loafs, or other minced meat applications, or a protein material may be mixed with meat and stuffed into casings to form frankfurters, sausages, or similar products.

Protein materials may be combined with plant components to reduce the cost of producing meat emulsions from the protein materials and to provide meat emulsions having improved meat-like characteristics. For example, wheat flour may be co-dried with a vegetable protein material such as soy protein isolate to form a composition useful as a meat extending component in a pet food emulsion which provides gel strength to the emulsion upon pasteurization.

Carbohydrates from plant materials are commonly used with protein materials to provide desirable characteristics to the protein materials and meat emulsions containing such protein materials. Starch is a particularly useful carbohydrate for use in combination with protein materials since starch is abundant and can improve the texture and taste of meat emulsions formed with a supplemental protein material.

Meat emulsions containing a protein material blended with starch have improved moisture and fat absorbing characteristics, which lead to improved taste and tenderness upon cooking the meat emulsion. In a study comparing the moisture retaining capacity of soy protein and a filler material formed of cold-blended soy protein and starch, the filler material was found to have a higher moisture retaining capacity, and, therefore, was determined to be the preferred material for forming meat emulsions. I. Rogov & V. Dianova, *Study of the Hygroscopic Properties of Meat and Meat Products*, Myasnaya Industriya SSSR, No. 12, pp. 29–31 (1978).

Dry-blended or cold-blended protein and starch mixes, while providing desirable moisture and fat absorbing characteristics in a meat emulsion, provide relatively poor gel strength and emulsion stability to a meat emulsion even after the emulsion is cooked. Gel strength and emulsion stability are desirable in a meat emulsion so the meat emulsion has a firm meat-like texture with a stable protein and moisture level.

A starch-protein complex having an improved gel strength and emulsion stability is disclosed in U.S. Pat. No. 4,159,982 to Hermansson. The starch-protein complex is formed by heating starch with an aqueous dispersion of casein at a temperature above the gelation temperature of the starch. The casein protein forms a complex with gelatinized starch granules. The degree of gel strength of the complex is greater than that of the casein itself and the emulsion stability of the protein is improved.

Gelatinization of starch in the presence of protein to form a protein-starch complex, while improving the gel strength and emulsion stability of the protein, excessively increases the viscosity of the complex relative to a dry-blend of the protein and starch, as well as that of a meat emulsion material containing the complex relative to a meat emulsion containing a dry or cold-blended mixture of protein and starch. Processing the high viscosity protein-starch complex into a meat emulsion, and processing the resulting high viscosity meat emulsion material is difficult and expensive on a commercial scale since the high viscosity materials do not flow easily.

What is needed, therefore, is a process for forming a low viscosity protein-starch composition and meat emulsion containing the same which have a high gel strength and emulsion stability upon being cooked.

SUMMARY OF THE INVENTION

The present invention is a protein-starch composition having a low viscosity in water and capable of forming a firm gel upon cooking. The protein-starch composition contains a protein material and a starch material. The protein material and the starch material are complexed, however, the starch material is in a substantially non-gelatinized state.

In one embodiment of the invention, at least some of the starch material of the protein-starch composition is partially encapsulated in the protein material.

In another aspect, the invention is a meat emulsion containing a protein-starch composition and a meat material which are blended together. The protein-starch composition is formed of a protein material and a starch material, where the protein material and the starch material are complexed and the starch material is in a substantially non-gelatinized state.

In yet another aspect the invention is a process for forming a low viscosity protein-starch composition which has a high gel strength and emulsion stability upon being cooked. An aqueous slurry of a protein material is formed. The slurry of protein material is treated at a temperature and for a time effective to denature the protein material. A non-gelatinized starch material is then added to the slurry of denatured protein material at a slurry temperature below the gelatinization temperature of the starch material. The slurry of denatured protein material and starch material is spray-dried under conditions sufficient to substantially couple the protein material and the starch material yet insufficient to substantially gelatinize the starch material to form the protein-starch composition.

In still another aspect, the present invention is a process for forming a low viscosity meat emulsion which attains a high gel strength and emulsion stability upon cooking. A protein-starch composition is provided containing a starch material coupled to a protein material with the starch material being substantially in its native non-gelatinized conformation. An aqueous slurry is formed of the protein-starch composition, and the slurry is blended with a meat material to form a meat emulsion.

The protein-starch composition of the present invention has a low viscosity well suited for use in large scale commercial production of meat emulsions, yet has a gel strength and emulsion stability comparable to a gelatinized starch-protein complex once the composition is cooked. Prior to cooking the protein-starch composition of the invention, or a meat emulsion containing the composition, the starch of the protein-starch composition is coupled to the protein substantially in its native, non-gelatinized state. This substantially reduces the viscosity of the protein-starch composition relative to a gelatinized starch-protein complex since gelatinized starch is much more viscous than non-gelatinized starch. Upon cooking the protein-starch composition or a meat emulsion containing the protein-starch composition, the closely associated protein and starch further complex as the starch is gelatinized by the cooking temperature, thereby developing a high gel strength and emulsion stability relative to a dry or cold-blended mix of protein and starch.

DESCRIPTION OF THE PREFERRED EMBODIMENTS

As used herein, gelatinized starch is defined as starch which has become hydrated and swollen relative to its native state as a result of being treated at a temperature, pressure, or mechanical shear sufficient to disrupt the structure of the native starch. Gelatinized starch is more viscous in water than native, non-gelatinized starch since the swollen gelatinized starch granules frictionally interact and because some of the swollen starch granules rupture releasing amylose, which readily hydrogen bonds to form a gel. Non-gelatinized starch, as used herein, is defined as a starch in its native state which has not been gelatinized.

The protein material used in the process of the present invention to form the protein-starch composition should be capable of forming an emulsion with a meat material such as a ground meat or a minced meat, when the protein material and meat material are blended together in an aqueous mixture. The protein material, therefore, should not be excessively soluble in water under neutral pH conditions. Preferably proteins in the protein material have an average associated molecular weight greater than 30,000 daltons, and more preferably greater than 100,000 daltons, and most preferably between about 100,000 and 360,000 daltons, to ensure that the protein material is not excessively soluble in water under neutral pH conditions.

The protein material used in the process of the present invention to form the protein-starch composition can be an animal protein material or a vegetable protein material. In one embodiment of the invention casein can be used as the protein material. Casein is prepared by coagulation of a curd from skim milk. The casein is coagulated by acid coagulation, natural souring, or rennet coagulation. To effect acid coagulation of casein a suitable acid, preferably hydrochloric acid, is added to milk to lower the pH of the milk to about the isoelectric point of the casein, preferably to a pH of about 4 to about 5, and most preferably to a pH of about 4.6 to about 4.8. To effect coagulation by natural souring milk is held in vats to ferment, causing lactic acid to form. The milk is fermented for a sufficient period of time to allow the formed lactic acid to coagulate a substantial portion of the casein in the milk. To effect coagulation of casein with rennet, sufficient rennet is added to the milk to precipitate a substantial portion of the casein in the milk. Acid coagulated, naturally soured, and rennet precipitated casein are all commercially available from numerous manufacturers or supply houses.

Preferably the protein material is a vegetable protein material since vegetable protein materials are inexpensive, abundant, and well suited for forming a protein-starch composition. Soy protein isolate, soy concentrate, or soy flour are the preferred vegetable protein materials used in the process for forming the protein-starch composition although the protein-starch composition may also be formed from other vegetable and plant protein sources such as peas, wheat, and rapeseed.

Soy flour, as that term is used herein, refers to a comminuted form of defatted soybean material, preferably containing less than 1% oil, formed of particles having a size such that the particles can pass through a No. 100 mesh (U.S. Standard) screen. The soybean material can be soy cake, chips, flakes, meal, or mixture of these materials, which are comminuted into a soy flour using conventional soy grinding processes. Soy flour has a soy protein content of about 40% to about 60%.

Soy concentrate, as the term is used herein, refers to a soy protein material containing about 60% to about 80% of soy protein. Soy concentrate is preferably formed from a commercially available defatted soy flake material from which the oil has been removed by solvent extraction. The soy concentrate is produced by washing the soy flake material with an aqueous solvent having a pH at about the isoelectric point of soy protein, preferably at a pH of about 4 to about 5, and most preferably at a pH of about 4.4 to about 4.6. The isoelectric wash removes a large amount of water soluble carbohydrates and other water soluble components from the flakes, but removes little of the protein, thereby forming a soy concentrate which is dried after the isoelectric wash.

Soy protein isolate, as the term is used herein, refers to a soy protein material containing about 80% or greater protein content, preferably about 90% or greater protein content, and most preferably about 95% or greater protein content. In a most preferred embodiment of the invention, the protein material used in the process of the invention is a soy protein isolate due to the high protein content of soy protein isolate.

Soy protein isolate is preferably formed from a commercially available defatted soy flake material from which oil has been removed by solvent extraction. The soy flake material is extracted with an aqueous alkaline solution, typically a calcium hydroxide or a sodium hydroxide solution having a pH of about 6 to about 10, to form an extract containing protein and water soluble components of the soy flake material which is separated from the insoluble fibers and cellulosic materials of the flakes. The extract is then treated with an acid to lower the pH of the extract to about the isoelectric point of the protein, preferably to a pH of about 4 to about 5, and most preferably to a pH of about 4.4 to about 4.6, thereby precipitating the protein. The protein is then separated from the extract and dried using conventional separating and drying means to form the soy protein isolate.

The protein material may be a modified protein material, where the protein material is modified by known processes to improve the suitability of the protein material for use in a meat emulsion. For example, a preferred protein material is a modified soy protein isolate having improved whiteness, as described in U.S. Pat. No. 4,309,344, which is incorporated herein by reference. The modified soy protein isolate of improved whiteness is prepared by heating an aqueous solution of precipitated soy protein isolate, present in about 20% to about 30% by weight of the solution, to a temperature of about 115° F. to about 145° F. for about 1 to about 300 seconds, followed by concentration of the precipitated protein to a solids level of above about 44%.

Soy protein isolates and modified soy protein isolates useful in the process of the invention are commercially available. Commercially available soy protein isolates that may be used in the invention include "Supro 500E", which is a modified soy protein isolate, and "Supro 515", both of which are available from Protein Technologies International, Checkerboard Square, St. Louis, Mo. Hereafter, the process of forming the protein-starch composition of the present invention will be described with respect to a soy protein isolate, however, other protein materials may be used in a similar manner.

An aqueous slurry is formed of the soy protein isolate material. The aqueous slurry preferably contains about 2% to about 30% soy protein isolate by weight, and most preferably contains about 15% to about 20% of the soy protein isolate by weight. The soy protein isolate is thoroughly mixed in the slurry for a period of time sufficient to mix the slurry by stirring, agitating, or blending the slurry with any conventional means for stirring, agitating, or blending capable of mixing the protein slurry. Preferably the slurry is mixed for about 15 minutes to about 1 hour, and most preferably for about 30 minutes to about 45 minutes at ambient temperatures.

The slurry of soy protein material is treated to denature the protein material. The protein material is denatured to unfold the protein material so the protein-starch complex can be formed and to enhance the gel and emulsion forming properties of the protein material. The protein material can be thermally denatured by being treated at a temperature and for a time sufficient to denature the soy protein material. For example, the protein material may be denatured by treating the slurry at a temperature of about 75° C. to about 160° C. for a period of from about 2 seconds to about 2 hours.

The preferred method of denaturing the soy protein material is treating the protein material slurry at a temperature elevated above ambient temperatures by injecting pressurized steam into the slurry for a time sufficient to substantially denature the protein material, hereafter defined as "jet-cooking". Jet-cooking slurries of protein material to denature the protein material is well-known and conventional in the art. The following description is a preferred method of jet-cooking a soy protein material slurry, however, the invention is not limited to the described method and includes any known method of jet-cooking protein slurries.

A protein material slurry is introduced into a jet-cooker feed tank where the soy protein material is kept in suspension with a mixer which agitates the slurry. The protein material slurry is directed from the feed tank to a pump which forces the slurry through a reactor tube. Steam is injected into the soy protein material slurry under pressure as the slurry enters the reactor tube, instantly heating the slurry to the desired temperature. The temperature is controlled by adjusting the pressure of the injected steam, and preferably is from about 85° C. to about 155° C., most preferably about 150° C. The slurry is treated at the elevated temperature for about 5 seconds to about 15 seconds, being treated longer at lower temperatures, with the treatment time being controlled by the flow rate of the slurry through the reactor tube. Preferably the flow rate is about 18.5 lbs./min., and the cook time is about 9 seconds.

After being heated to denature the protein material in the slurry, the slurry is cooled to a temperature below the gelatinization temperature of the starch with which the protein material is to be combined. Cooling may be effected by conventional methods such as allowing the slurry to stand in ambient temperatures until the slurry has cooled, refrigerating the slurry, or placing the slurry in an ice bath.

In a preferred embodiment, after being jet-cooked the protein material slurry is discharged from the reactor tube of the jet-cooker into a vacuumized chamber to flash cool the slurry. The pressure of the slurry is instantly dropped to the pressure in the vacuumized chamber, which is preferably about 25 to about 30 mm Hg. The pressure drop instantly cools the slurry to a temperature of about 30° C. to about 60° C., and to about 55° C. when the slurry is treated at a temperature of about 150° C. in the jet-cooking process.

After the soy protein material slurry is denatured and cooled, a starch material is combined and mixed with the protein material slurry. It is important that the starch material be added to the protein material slurry only after the temperature of the protein material slurry is below the gelatinization temperature of the starch material so that the starch material is not subjected to temperatures which would prematurely gelatinize the starch. Preferably the starch material is added to the protein material slurry when the temperature of the protein material slurry is about 25° C. to about 45° C.

The starch material used to form the protein-starch composition is a naturally occurring starch. The starch material may be isolated from a variety of plants such as corn, wheat, potato, rice, arrowroot, and cassava by well-known, conventional methods. Starch materials useful in forming the protein-starch composition include the following commercially available starches: corn, wheat, potato, rice, high amylose corn, waxy maize, arrowroot, and tapioca. Although the starches vary in molecular structure, the starches have similar general functional properties, in particular, the capacity to couple with a protein material upon being co-spray dried with the protein material, and the capacity to gelatinize upon being exposed to temperatures, pressure, or shear sufficient to induce gelatinization.

Preferably the starch material used to form the protein-starch composition is a corn starch or a wheat starch, and most preferably is dent corn starch. A preferred dent corn starch is commercially available from A. E. Staley Mfg., Co. sold as Dent Corn Starch, Type IV, Pearl.

The starch material is preferred to be unmodified. Modified starches are defined herein as native starches which have been chemically or otherwise treated to form a starch derivative. Modified starches often have altered properties such as decreased gelling strength or raised gelation temperatures which are not desirable in the protein-starch composition of the invention. Although modified starches are generally not preferred for use in the present invention, modified starches can be used provided that the modification does not adversely affect the formation of the protein-starch composition and its viscosity, or the gelation and emulsion stability properties of a cooked meat emulsion containing the protein-starch composition.

The amount of starch material added to the protein material slurry is selected to provide the desired ratio of protein material to starch material. The ratio of protein material to starch material in the slurry is a factor in the gel strength of the protein-starch composition formed from the slurry. Higher levels of starch can increase the gel strength of the protein-starch composition. In a preferred embodiment, the starch is added to the protein material slurry so that the ratio of protein material to starch material in the slurry by dry weight is about 45:60 to about 80:20, and most preferably is about 50:50 to about 70:30.

The starch material may be added to the protein material slurry dry, or an aqueous slurry of the starch material may be formed and then added to the protein material slurry. Preferably, an aqueous slurry is formed of the starch material. The starch slurry preferably contains about 20% to about 40% by weight of the starch material, most preferably about 30% to about 35% by weight of the starch material.

Should a slurry be formed of the starch material, the temperature of the starch material slurry must be maintained below the gelation temperature of the starch material, which is typically about 50° C. to about 70° C., to prevent the starch material from gelatinizing. Preferably the starch material is added to cold water and the slurry is maintained at ambient temperatures.

The starch material is mixed in the starch material slurry for a period of time sufficient to thoroughly mix the starch material in the slurry with any conventional means for stirring, agitating, or blending the slurry. Gentle agitation should be continued after the slurry is mixed to prevent the starch material from settling out. Care must be taken in mixing and agitating the starch material slurry not to subject the starch material to excessive mechanical shear so the starch material is not gelatinized.

Other materials may be added to the combined protein material and starch material slurry to add desired characteristics to the protein-starch composition formed from the slurry. For example, gums such as guar gum or other compounds such as trisodium phosphate, sodium tripolyphosphate, or sodium acid pyrophosphate may be added to modify the flow characteristics of the protein-starch composition.

The slurry containing the protein material and the starch material may be mixed by any conventional means for mixing, blending, or stirring slurries containing significant amounts of suspended solids. Preferably, the protein material and starch material are mixed in an agitating tank. The slurry should be thoroughly mixed until the slurry is a homogenous mixture of the protein material and starch material. Water may be added to the combined slurries to adjust the level of suspended solids in the combined slurries to a level which may be easily handled in a spray drying operation. Preferably the level of suspended solids in the combined slurries is about 5% to about 25% by weight, and more preferably is from about 14% to about 17% by weight.

The combined slurry of starch material and protein material is then spray dried to form the protein-starch composition. The slurry is spray-dried under conditions which cause the protein material and the starch material to couple together and form a complex where the starch material remains substantially in its native non-gelatinized state. Some of the starch material is at least partially encapsulated in protein when the protein material and starch material are spray dried together. Preferably a majority of the starch material is encapsulated in the protein material, and most preferably, substantially all of the starch material is encapsulated in the protein material.

The spray-dry conditions should be moderate to avoid gelatinizing the starch, so the resulting protein-starch composition will have a low viscosity when rehydrated. Preferably the spray-dryer is a co-current flow dryer where hot inlet air and the protein-starch slurry, atomized by being injected into dryer under pressure through an atomizer, pass through the dryer in a co-current flow. The protein-starch composition formed by spray-drying the slurry in a co-current flow dryer is not subject to heat degradation or starch gelatinization since the evaporation of water from the starch and protein materials cools the materials as they dry.

In a preferred embodiment, the slurry of protein and starch materials is injected into the dryer through a nozzle atomizer. Although a nozzle atomizer is preferred, other spray-dryer atomizers, such as a rotary atomizer, may be utilized. The slurry is injected into the dryer under enough pressure to atomize the slurry. Preferably the slurry is atomized under a pressure of about 3000 psig to about 4000 psig, and most preferably about 3500 psig.

Hot air is injected into the dryer through a hot air inlet located so the hot air entering the dryer flows co-currently with the atomized protein-starch mixture sprayed from the atomizer. The hot air has a temperature of about 550° F. to about 600° F., and preferably has a temperature of about 555° F. to about 570° F.

The protein-starch composition is collected from the spray dryer. Conventional means and methods of collecting spray-dried materials may be used to collect the protein-starch composition, including cyclones, bag filters, electrostatic precipitators, and gravity collection.

The collected protein-starch composition can be used to form a meat emulsion containing the protein-starch composition and a meat material. An aqueous mixture of the protein-starch composition and a meat material is formed and the protein-starch composition and meat material are ground or chopped together according to conventional methods for blending protein and meat materials to form the meat emulsion.

The meat material can be a meat useful for forming sausages, frankfurters, or other meat products formed by filling a casing with meat material, or can be a meat such as pork, chicken or beef useful in ground meat applications such as hamburgers, meat loaf, and minced meat products. Particularly useful meat materials include mechanically deboned meat from chicken, beef, and pork, pork trimmings, beef trimmings, and pork backfat.

The ratio of meat material and the protein-starch composition in the slurry is selected to provide a meat emulsion having meat-like characteristics. Preferably the protein-starch composition provides about 10% to about 20% of the total protein in the meat emulsion, most preferably about 10% to about 15%, and comprises about 2% to about 7% of the meat emulsion, including the water, by weight. Preferably the meat material comprises about 40% to about 60% of the meat emulsion by weight, and the water comprises about 30% to about 40% of the meat emulsion by weight.

The slurry of the protein-starch composition and meat material is blended thoroughly to form the meat emulsion. The slurry is blended by stirring, agitating, or mixing the slurry for a period of time sufficient to form a homogenous meat emulsion. Excessive shear and temperatures above the gelation temperature of the starch in the protein-starch composition should be avoided while blending the slurry so the starch in the protein-starch composition will not become gelatinized.

Conventional means for stirring, agitating, or mixing the slurry may be used to effect the blending. Preferred means for blending the meat emulsion are a cutter bowl which chops the materials in the slurry with a knife, and a mixer/emulsifier which grinds the materials in the slurry. A preferred cutter bowl is the Hobart Food Cutter Model No. 84142 with 1725 rpm shaft speed.

After the slurry has been blended to form a meat emulsion containing the protein-starch composition, the meat emulsion may be used to form meat products. The meat emulsion may be used to stuff meat casings to form sausages, frankfurters, and similar products. The meat emulsions may also be used to form ground meat products such as hamburgers, meat loaf, and other minced meat products.

A meat emulsion containing the protein-starch composition is relatively low in viscosity since aqueous mixtures containing the protein-starch composition are not particularly viscous. An aqueous slurry of a protein-starch composition containing about 10% to about 20% of the composition, where the starch in the protein-starch composition is a corn starch, may have a Brookfield viscosity of about 500 centipoise to about 11,000 centipoise at about 25° C., and about 80 centipoise to about 6000 centipoise at about 60° C. An aqueous slurry of a protein-starch composition containing about 10% to about 20% of the composition, where the starch in the protein-starch composition is a wheat starch, may have a Brookfield viscosity of about 200 centipoise to about 4000 centipoise at about 25° C., and about 50 centipoise to about 700 centipoise at about 60° C.

A meat emulsion formed of the protein-starch composition and a meat material also has a relatively high gel strength upon being cooked, which provides the cooked meat emulsion with a desirable firm texture.

The present invention is illustrated in more detail by the following examples using a soy protein isolate as the protein material. The examples are intended to be illustrative, and should not be interpreted as limiting or otherwise restricting in scope of the invention in any way.

EXAMPLE 1

A protein-starch composition is formed according to the process of the present invention with a corn starch. 60 lbs of soy protein isolate "SUPRO 500E" from Protein Technologies International, Inc. is slurried in 333 pounds of 70° F. water to form a protein material slurry having a total solids content of 14.5%. 196 lbs of the slurry are treated at 285° F.±5° F. for 9 seconds±1 second under pressure to denature the protein, and then the slurry is flash cooled by being ejected into a vacuumized chamber having a vacuum of about 25 Hg.

A starch slurry is formed by adding 20 lbs of dent corn starch, type IV, pearl from A. E. Staley Mfg. Co. to 31 lbs of cold water. The slurry is agitated in an agitating tank until the slurry becomes homogenous.

About 40 lbs of the denatured protein slurry and about 13 lbs of the corn starch slurry are mixed together until the protein and starch slurries are homogenized. The protein-starch slurry is spray dried in a co-current type spray dryer at an atomization pressure of 3500 psig through a 30SDX nozzle, a feed temperature of 130° F. maximum, and an exhaust air temperature of 200° F. maximum. A spray dried protein-starch composition formed according to the process of the present invention having a protein:starch ratio of about 55:45 is collected from the spray dryer.

EXAMPLE 2

A frankfurter meat emulsion containing a protein-starch composition formed according to the present invention is produced. A protein-starch composition is formed in a manner similar to the protein-starch composition of Example 1, but having a protein:starch ratio of about 52:48. Beef trimmings, pork backfat, pork trimmings, water, modified food starch, a small amount of oils, seasonings, and preservatives, and the protein-starch composition are introduced into a chopper bowl. The components are present in the following percentages, by weight: protein-starch composition 2%, beef trimmings 22.9%, pork trimmings 21%, pork backfat 5%, water 36.4%, modified food starch 7%, oils and seasonings 5.7%. The mixture is chopped in the chopper bowl to sufficiently to form a meat emulsion. The meat emulsion is stuffed into casings suitable for forming frankfurters, and the stuffed casings are cooked to prepare the frankfurters.

EXAMPLE 3

A protein-starch composition is formed according to the present invention with a wheat starch. 88 lbs of soy protein isolate "SUPRO 500E" from Protein Technologies International, Inc. is slurried in 488 lbs of 70° F. water to form a protein material slurry having a total solids content of about 14.5%. The slurry is treated at 305° F.±5° F. for 9 seconds±1 second and under pressure to denature the protein, and then the slurry is flash cooled by being ejected into a vacuumized chamber having a vacuum of about 25 Hg.

A wheat starch slurry is formed by adding 59 lbs of wheat starch to cold water to form a starch slurry of about 32% total solids. The starch slurry is mixed until it becomes homogenous.

About 44 lbs of the denatured protein slurry is added to the starch slurry and the combined slurry is mixed until the protein and the starch are homogeneously mixed in the slurry. The protein-starch slurry is spray-dried in a co-current type spray dryer at an atomization pressure of 3500 psig through a 30SDX nozzle, at a feed temperature of 130° F. maximum, and at an exhaust temperature of 200° F. maximum. A spray-dried protein-starch composition formed according to the present invention is collected from the spray-dryer.

EXAMPLE 4

The viscosity of the protein-starch compositions formed in Example 1 and Example 3 is measured. The viscosity of each composition is measured at 10%, 12.5%, 15%, and 20% aqueous slurries of the composition at 25° C. and at 60° C. using a Brookfield LVT viscometer. The results are set forth in Table 1.

TABLE 1

| | Viscosity (cps) | | | |
|---|---|---|---|---|
| Sample | 10% slurry | 12.5% slurry | 15% slurry | 20% slurry |
| Protein-corn starch 25° C. | 547 | 877 | 2517 | 10716 |
| Protein-corn starch 60° C. | 80 | 218 | 522 | 5733 |
| Protein-wheat starch 25° C. | 204 | 498 | 450 | 3716 |
| Protein-wheat starch 60° C. | 53 | 123 | 230 | 670 |

EXAMPLE 5

The gel strength of the protein-starch compositions formed in Example 1 and Example 3 is measured. Each composition is mixed with water at a ratio of 1 part of the composition to 6 parts of water, by weight, to a total weight of 2700 grams. The gel strength of each composition having added salt, and having no salt added is measured upon being cooked under pasteurizing conditions and under retort conditions. The measured gel strengths are set forth in Table 2.

TABLE 2

| | Gel Strength (g) | | | |
|---|---|---|---|---|
| Sample | Pasteurized, no salt | Pasteurized, salt | Retorted, no salt | Retorted, salt |
| Protein-corn starch | 877 | 1021 | 289 | 976 |
| Protein-wheat starch | 715 | 1191 | 465 | 1276 |

EXAMPLE 6

A comparison is made of the viscosity and gel strength of protein-starch compositions having different protein:starch ratios, where the protein-starch compositions are formed according to the present invention.

An aqueous slurry of soy protein isolate is formed by adding 132 lbs. of "Supro 500E" soy protein isolate from Protein Technologies International, Inc. to 704 lbs. of water, the water having a temperature of about 85° F. The protein slurry is mixed thoroughly for 45 minutes and then is treated at a temperature of about 305° F. for about 9 seconds under pressure to denature the protein. The slurry is flash cooled to a temperature of about 130° F. by ejecting the slurry into a vacuumized chamber having a pressure of about 26 mm Hg.

To compare the effect of varying protein:starch ratios on viscosity and gel strength of protein-starch compositions formed according to the present invention, the cooked protein slurry is divided into three parts ("I", "II", "III"") where protein-starch compositions of decreasing protein-:starch ratios of 75:25, 70:30, and 42:58 are formed from parts I–III of the protein slurry, respectively.

Part I is formed by separating 150 lbs of the protein slurry, adding 7.2 lbs of corn dent starch, and mixing the resulting protein-starch slurry for 20 minutes. Part II is formed by separating 125 lbs of the protein slurry, adding a slurry of corn dent starch formed of 12.6 lbs of corn dent starch and 26 lbs of water to the protein slurry, and mixing the resulting protein-starch slurry for 20 minutes. Part III is formed by separating about 100 lbs of the protein slurry, adding a slurry of corn dent starch formed of 19.4 lbs of the starch and 60 lbs of water to the protein slurry, and mixing the resulting protein-starch slurry for about 20 minutes.

Slurries I–III are then separately spray dried in a co-current type spray dryer. Each slurry is fed through an atomizing nozzle at a pressure of about 3500 psig and is atomized into the spray dryer. The drying air blown through the air inlet of the spray dryer is set to a temperature of about 550° F., which is sufficient to cause the protein and starch in slurries I–III to interact to form protein-starch compositions I–III without causing substantial gelatinization of the starch. Each of the slurries I–III is dried in the spray dryer to a moisture content of about 5%. About 5 lbs to about 10 lbs of spray-dried material is recovered from each slurry.

The viscosity and gel strength characteristics are determined for the protein-starch compositions I–III. To determine the viscosity of the protein compositions I–III, a 10% aqueous solution is formed of each, and the viscosity of each is measured using a Brookfield viscometer at about 25° C.

The results of the viscosity and gel strength measurements for the protein compositions I–III are set forth in Table 3 below.

TABLE 3

| Assay | Sample I<br>75:25 prot/starch | Sample II<br>70:30 prot/starch | Sample III<br>42:58 prot/starch |
| --- | --- | --- | --- |
| Viscosity (centipoise) | 900 | 580 | 160 |
| Instron gel strength-past. no salt (grams) | 640 | 760 | 880 |
| Instron gel strength-past. salt (grams) | 880 | 930 | 1960 |

EXAMPLE 7

A comparison is made of the relative viscosities of a protein-corn starch composition made according to the present invention and a protein-corn starch composition containing substantially gelatinized starch. A non-gelatinized protein-starch composition made according to the present invention is formed as described above in Example 1. Another protein-starch composition is formed in a substantially similar manner, except that the starch slurry is mixed with the protein material slurry before treating the protein material slurry at 285° F.±5° F. for 9 seconds±1 second under pressure so the starch will gelatinize and form a complex with the protein during heating.

10%, 12.5%, and 15% aqueous solutions are formed of the non-gelatinized protein-starch composition and the gelatinized protein-starch composition. The Brookfield viscosity of each solution is determined at 25° C. and 60° C. The results are set forth in Table 4.

TABLE 4

| | Viscosity (cps) | | |
| --- | --- | --- | --- |
| Sample | 10% solution | 12.5% solution | 15% solution |
| Non-gelatinized (25° C.) | 547 | 877 | 2517 |
| Gelatinized (25° C.) | 650 | 2175 | 10100 |
| Non-gelatinized (60° C.) | 80 | 218 | 522 |
| Gelatinized (60° C.) | 1900 | 6350 | 17700 |

The protein-starch composition of the present invention is substantially less viscous than a gelatinized protein-starch complex. The less viscous protein-starch composition is more easily handled in processing than the viscous gelatinized material.

EXAMPLE 8

A comparison is made of the relative gel strengths of a protein-wheat starch composition made according to the present invention and a dry-blend of a protein-wheat starch. A protein-starch composition made according to the present invention is formed as described above in Example 3 (Protein-Starch Composition), where the resulting product contains 56% protein, by weight, on a dry basis. A dry-blend of soy protein isolate and wheat starch is made by dry-blending soy protein isolate and wheat starch (Dry Blend), where the resulting product contains 57.6% protein, by weight, on dry basis. The gel strength of the Protein-Starch Composition and the Dry Blend are measured. The results are set forth in Table 5.

TABLE 5

| | Gel Strength (g) | | | |
| --- | --- | --- | --- | --- |
| Sample | Pasteurized, no salt | Pasteurized, Salt | Retorted, no salt | Retorted, salt |
| Protein-Starch | 715 | 1192 | 465 | 1276 |
| Dry Blend | 403 | 965 | 0-(not measurable) | 838 |

The protein-starch composition of the present invention has higher gel strength than a dry blend of a protein material and a starch after cooking for all measured types of cooking. The protein-starch material, therefore, can provide a more firm texture to a meat emulsion upon cooking than a dry blend of protein and starch.

EXAMPLE 9

A comparison is made of the viscosity and gel strength of a soy protein isolate, a co-dried wheat flour and soy protein composition, and a co-dried wheat starch and soy protein material formed according to the present invention.

84 lbs. of soy protein isolate "SUPRO 500E" from Protein Technologies International, Inc. is slurried in 492 lbs. of 70° F. water to form a protein material slurry having a total solids content of about 14.4%. The slurry is treated at 287° F. for 9 seconds under pressure to denature the protein, and then the slurry is flash cooled by being ejected into a vacuumized chamber having a vacuum of about 26 Hg.

An aqueous wheat starch slurry containing 30.7% wheat starch is formed by adding 13.5 lbs of wheat starch to 44 lbs. of water and thoroughly mixing the wheat starch in the water. A separate aqueous wheat flour slurry containing 31.9% wheat flour is also formed by adding 14.4 lbs. of wheat flour to 45.1 lbs. of water and mixing thoroughly.

The denatured soy protein slurry is divided into three portions, one of which is mixed with the aqueous wheat starch slurry, another of which is mixed with the aqueous wheat flour slurry, and the last of which is maintained with just the denatured soy protein isolate therein. 140 lbs. of the denatured soy protein isolate slurry containing 21 lbs. of soy protein isolate solids is mixed with the wheat starch slurry, and 126 lbs of the denatured soy protein isolate slurry containing 19 lbs. of soy protein isolate solids is mixed with the wheat flour slurry.

The wheat starch/soy protein isolate slurry, the wheat flour/soy protein isolate slurry, and the remaining denatured soy protein isolate slurry are then spray dried in a co-current type spray drier. Each slurry is spray dried at an atomization pressure of 3500 psig at feed temperatures from 114° F. to 125° F., at inlet temperatures from 503° F. to 511° F., and at a maximum exhaust temperature of 200° F. Thirty lbs. of the co-dried wheat starch/protein material is collected, 27 lbs. of the co-dried wheat flour/protein material is collected, and 7.5 lbs. of the spray dried soy protein isolate is collected.

The viscosity of the wheat starch/protein material, the wheat flour/protein material, and the soy protein isolate samples are compared at 25° C. and 60° C. with 10%, 12.5%, 15% and 20% aqueous slurries of the respective samples using a Brookfield LVT viscometer. The results are set forth in Table 6.

TABLE 6

| Sample | Viscosity (cps) | | |
|---|---|---|---|
| | Wheat starch/ protein | Wheat flour/ protein | Protein only |
| 25° C. | | | |
| 10% slurry | 204 | 400 | 1450 |
| 12.5% slurry | 498 | 843 | 6350 |
| 15% slurry | 451 | 1803 | 13100 |
| 20% slurry | 3717 | 5300 | 50000 |
| 60° C. | | | |
| 10% slurry | 53 | 40 | 553 |
| 12.5% slurry | 123 | 87 | 1933 |
| 15% slurry | 230 | 431 | 27000 |
| 29% slurry | 670 | 7266 | 50000 |

As can be seen by comparing the viscosities of the samples, the co-dried wheat starch/protein material provides consistently low viscosity, and is less viscous than the co-dried wheat flour/protein material, particularly in higher solids slurries. Both the co-dried wheat starch/protein and co-dried wheat flour/protein materials are considerably less viscous than slurries of the spray dried protein material.

The gel strengths of the co-dried wheat starch/protein material, the co-dried wheat flour/protein material, and the dried protein material samples are also compared. Each sample is mixed with water at a ratio of 1 part of the sample material to 6 parts of water, by weight, to a total of 2700 grams. The gel strength of each sample having added salt, and having no salt added is measured upon being cooked under pasteurizing conditions and under retort conditions. The measured gel strengths are set forth in Table 7.

TABLE 7

| Sample | Gel Strength (g) | | |
|---|---|---|---|
| | Wheat starch/ protein | Wheat flour/ protein | Protein only |
| Pasteurized | | | |
| Salt Added | 1192 | 772 | 972 |
| No Salt | 715 | 442 | 567 |
| Retorted | | | |
| Salt Added | 1277 | 829 | 1055 |
| No Salt | 465 | 454 | 460 |

As can be seen by comparing the gel strengths of the samples, the co-dried wheat starch/protein material provides better gel strength upon cooking under all conditions than the co-dried wheat flour/protein material and the spray dried protein material. The gel strength provided by the co-dried wheat starch/protein material is significantly greater than the gel strength of the other samples under most of the cooking conditions.

In the above Examples, the viscosity of each of the above protein-starch compositions is measured using a Brookfield LVT viscometer (available from Brookfield Engineering Laboratories Inc., Stoughton, Mass).

Gel strengths in the Examples above are measured in the following manner. A gel is initially formed of a composition by mixing the dry composition with water in a 1:6 ratio, preferably to a total weight of 2700 grams, then thoroughly chopping the resulting mixture for about 10 minutes in a chopper bowl, preferably a Hobart Food Cutter Model No. 84142 with 1725 rpm shaft speed. Salt may be added to the gel after about 5 minutes of chopping, if the gel strength to be measured is the gel strength with salt added. About 28 grams of salt are added per 1400 grams of gel. The gel is then placed in a can, preferably a 3-piece 307 mm×113 mm aluminum can, packed into the can, and the can is sealed.

The resulting canned gel is cooked by being pasteurized or retorted. To pasteurize a gel, the can of gel is placed in boiling water for about 30 minutes. The can is then removed and cooled for 30 minutes under cold tap water, and then is refrigerated for 16 to 24 hours. To retort a gel, a can of gel is placed in a retort chamber capable of providing temperatures of 230° F. The can of gel is retorted at 230° F. for about 70 minutes, then is removed and cooled under cold tap water for about 30 minutes, followed by refrigeration for about 16 to 24 hours.

After refrigeration a can of pasteurized or retorted gel is placed in a 25° C.–30° C. water bath for about 2–3 hours to achieve thermal equilibrium. The gel is prepared for gel strength measurement by removing the gel from the can, leaving the gel sitting on the bottom lid of the can.

Gel strength is measured with an Instron Universal Testing Instrument, Model No. 1122 with a 36 mm probe. The probe is driven into each gel until the gel breaks, which is marked by a peak on a recorder. The amount of force required to break the gel is determined from the distance the probe is driven into the gel prior to the gel breaking. The gel strength is determined from the force required to break the gel according to the following formula: Gel Strength (grams)=(F/100)(G)(454), where F=point of gel fracture in chart units; 100=total number of chart units; G=full scale load in pounds at a full scale load dial reading of "×10"; and 454=number of grams per pound. The point of gel fracture in chart units (F) is determined by drawing a tangent to the upper portion of the peak on the chart, and parallel to the slope.

It will be appreciated by those skilled in the art that various changes may be made in the invention as disclosed without departing from the spirit of the invention. The invention is not to be the specifics of the disclosed embodiments, which are for the purpose of illustration, but rather is to be limited only by the scope of the appended claims and their equivalents

What is claimed is:

1. A protein-starch composition having a low viscosity in water and capable of forming a firm gel upon cooking, comprising,
   a denatured protein material and a starch material, where said denatured protein material and said starch material are complexed and said starch material is in a substantially non-gelatinized state.

2. The protein-starch composition of claim 1 wherein at least some of said starch material is partially encapsulated in said protein material.

3. The protein-starch composition of claim 1 wherein at least a majority of said starch material is encapsulated in said protein material.

4. The protein-starch composition of claim 1 wherein substantially all of said starch material is encapsulated in said protein material.

5. The protein-starch composition of claim 1 further comprising a material selected from one or more of guar gum, trisodium phosphate, sodium tripolyphosphate, and sodium acid pyrophosphate.

6. The protein-starch composition of claim 1 wherein said protein material is present in said composition in a ratio of protein material to said starch material of about 45:65 to about 80:20 by dry weight.

7. The protein-starch composition of claim 6 wherein said protein material is present in said composition in a ratio of protein material to said starch material of about 50:50 to about 70:30 by dry weight.

8. The protein-starch composition of claim 1 wherein said starch is selected from one or more of a group comprising corn starch, potato starch, wheat starch, rice starch, arrowroot, tapioca starch, and mixtures thereof.

9. The protein-starch composition of claim 8 wherein said starch is a corn starch.

10. The protein-starch composition of claim 8 wherein said starch is a wheat starch.

11. The protein-starch composition of claim 1 wherein said protein material is not excessively soluble in water at neutral pH conditions.

12. The protein-starch composition of claim 11 wherein proteins in said protein material have an average associated molecular weight greater than 30,000 daltons.

13. The protein-starch composition of claim 12 wherein proteins in said protein material have an average associated molecular weight greater than 100,000 daltons.

14. The protein-starch composition of claim 13 wherein proteins in said protein material have an average associated molecular weight between about 100,000 and about 360,000 daltons.

15. The protein-starch composition of claim 1 wherein said protein material is selected from one or more of an animal protein, a vegetable protein, and mixtures thereof.

16. The protein-starch composition of claim 15 wherein said protein material is casein.

17. The protein-starch composition of claim 15 wherein said protein material is a vegetable protein material derived from one or more of peas, wheat, or rapeseed.

18. The protein-starch composition of claim 15 wherein said protein material is a soy protein material.

19. The protein-starch composition of claim 18 wherein said soy protein material is selected from at least one of a soy protein isolate, a soy protein concentrate, or a soy flour.

20. A meat emulsion, comprising:
   a protein-starch composition formed of a denatured protein material and a starch material, where said denatured protein material and said starch material are complexed and said starch material is in a substantially non-gelatinized state; and
   a meat material which is blended with said protein-starch composition.

21. The meat emulsion of claim 20 wherein at least some of said starch material in said protein-starch composition is at least partially encapsulated in said protein material.

22. The meat emulsion of claim 21 wherein at least a majority of said starch material in said protein-starch composition is encapsulated in said protein material.

23. The meat emulsion of claim 20 wherein said protein-starch composition contains a material selected from one or more of guar gum, trisodium phosphate, sodium tripolyphosphate, and sodium acid pyrophosphate.

24. The meat emulsion of claim 20 wherein said protein material is present in said protein-starch composition in a ratio of protein material to said starch material of about 45:65 to about 80:20 by dry weight.

25. The meat emulsion of claim 20 wherein said starch of said protein-starch composition is selected from one or more of a group comprising corn starch, potato starch, wheat starch, rice starch, arrowroot, tapioca starch, and mixtures thereof.

26. The meat emulsion of claim 20 wherein said protein material of said protein-starch composition is not excessively soluble in water at neutral pH conditions.

27. The meat emulsion of claim 20 wherein said protein material of said protein-starch composition is selected from at least one of casein, a soy protein material, or a vegetable or plant protein material derived from peas, wheat, or rapeseed.

28. The meat emulsion of claim 27 wherein said protein material of said protein-starch composition is a soy protein isolate or a soy protein concentrate.

29. The meat emulsion of claim 20 wherein said meat material is selected from at least one of mechanically deboned chicken, mechanically deboned beef, mechanically deboned pork, pork trimmings, beef trimmings, or pork backfat.

30. The meat emulsion of claim 20 wherein said protein-starch composition comprises about 2% to about 7% of said meat emulsion by weight.

31. The meat emulsion of claim 20 wherein said protein-starch composition provides about 10% to about 20% of the total protein in said meat emulsion.

32. The meat emulsion of claim 20 wherein said meat material comprises about 40% to about 60% of said meat emulsion by weight.

33. A process for forming a protein-starch composition, comprising:

forming an aqueous slurry of a protein material;

treating said slurry at a temperature and for a time effective to denature said protein material;

adding a non-gelatinized starch material to said slurry of denatured protein material at a slurry temperature below the gelatinization temperature of said starch material; and spray-drying said slurry of denatured protein material and said starch material under conditions sufficient to substantially complex said protein material and said starch material yet insufficient to substantially gelatinize the starch material.

34. The process as set forth in claim 33 wherein, prior to adding said non-gelatinized starch material, said slurry of protein material is formed to contain about 2% to about 30% by weight of said protein material.

35. The process set forth in claim 33 wherein said protein material is casein or a soy protein material.

36. The process as set forth in claim 33 wherein, prior to adding said non-gelatinized starch material, said slurry is treated at a temperature of about 85° C. to about 155° C. for a period of about 5 seconds to about 15 seconds to denature said protein material.

37. The process as set forth in claim 33 wherein, prior to adding said non-gelatinized starch material, said slurry is treated at a temperature of at least about 121° C. for a period of at least 5 seconds to denature said protein material.

38. The process set forth in claim 33 wherein said non-gelatinized starch material added to said slurry of denatured protein material is an aqueous slurry of a non-gelatinized starch containing about 20% to about 40% by weight of said non-gelatinized starch material.

39. The process set forth in claim 33 wherein said starch material is added to said slurry so said protein material and said starch material are present in said slurry in a ratio of protein material to starch material of about 45:65 to about 80:20 by dry weight.

40. The process set forth in claim 39 wherein said starch material is added to said slurry so said protein material and said starch material are present in said slurry in a ratio of protein material to starch material of about 50:50 to about 70:30 by dry weight.

41. The process set forth in claim 33 wherein said starch is selected from a group comprising corn starch, potato starch, wheat starch, rice starch, arrowroot, tapioca starch, and mixtures thereof.

42. A process for forming a low viscosity meat emulsion which attains a high gel strength and emulsion stability upon cooking, comprising:

providing a protein-starch composition containing a starch material complexed with a denatured protein material with said starch material being substantially in its native non-gelatinized conformation;

forming an aqueous mixture containing said protein-starch composition and a meat material; and blending said mixture of said protein-starch composition and meat material under conditions insufficient to gelatinize said starch material in said protein-starch composition to form a meat emulsion.

43. The process set forth in claim 42 wherein said protein material in said protein-starch composition is casein or a vegetable protein material.

44. The process set forth in claim 43 wherein said vegetable protein material is a soy protein material.

45. The process set forth in claim 42 wherein said starch material in said protein-starch composition is selected from the group comprising corn starch, potato starch, rice starch, wheat starch, arrowroot, tapioca starch, and mixtures thereof.

46. The process set forth in claim 42 wherein said protein material and said starch material of said protein-starch composition are present in said protein-starch composition in a ratio of protein material to starch material of about 45:65 to about 80:20 by dry weight.

47. The process set forth in claim 46 wherein said protein material and said starch material of said protein-starch composition are present in said protein-starch composition in a ratio of protein material to starch material of about 50:50 to about 70:30 by dry weight.

48. The process set forth in claim 42 wherein said aqueous mixture of said protein-starch composition and meat material contains about 2% to about 7% by weight of said protein-starch composition.

49. The process set forth in claim 42 wherein said meat material is a ground meat or a cured meat.

50. The process set forth in claim 42 further comprising stuffing a casing with said meat emulsion.

* * * * *